United States Patent [19]

Schafer

[11] 4,271,910
[45] Jun. 9, 1981

[54] DRAFT SENSING DEVICE INCLUDING LOAD PIN WITH FREE END

[75] Inventor: Richard A. Schafer, Traer, Iowa

[73] Assignee: Deere & Company, Moline, Ill.

[21] Appl. No.: 53,913

[22] Filed: Jul. 2, 1979

[51] Int. Cl.³ .......................................... A01B 63/112
[52] U.S. Cl. ........................................ 172/7; 172/430
[58] Field of Search .................... 172/7, 8, 9, 10, 11, 172/12, 430, 439, 443; 280/405 B, 446 R, 446 A, 456 A, 460 A, 461 A

[56] References Cited

U.S. PATENT DOCUMENTS

| 3,239,013 | 3/1966 | Hanssmann | 172/10 |
| 3,246,702 | 4/1966 | Carlin | 172/10 |
| 3,516,498 | 6/1970 | Schowalter | 172/9 |
| 3,517,747 | 6/1970 | Fischer | 172/7 |
| 3,520,369 | 7/1970 | Nicholson | 172/7 |
| 3,814,188 | 6/1974 | Ahne | 172/7 |
| 3,994,347 | 11/1976 | Schowalter | 172/9 |
| 3,994,348 | 11/1976 | Schowalter | 172/9 |
| 3,995,696 | 12/1976 | Kainer et al. | 172/7 |
| 4,059,159 | 11/1977 | Moorhouse et al. | 172/7 |
| 4,185,697 | 1/1980 | Berg | 172/10 |

FOREIGN PATENT DOCUMENTS

| 1209789 | 1/1966 | Fed. Rep. of Germany | 172/7 |
| 1094226 | 12/1967 | United Kingdom | 172/7 |

Primary Examiner—Richard T. Stouffer

[57] ABSTRACT

An improved draft sensing device for a tractor draft control system, the draft sensing device including a tapered load pin having its large end rigidly attached to the tractor and its free end pivotally carrying the tractor draft link through a load arm which imposes a torsional load on the load pin in proportion to the draft load. A bracket secured to the load arm amplifies and measures the load pin motion.

14 Claims, 5 Drawing Figures

DRAFT SENSING DEVICE INCLUDING LOAD PIN WITH FREE END

BACKGROUND OF THE INVENTION

The present invention relates to an improved sensing device for use in a tractor draft control system.

It is common practice to incorporate in a tractor three-point hitch a system which senses the draft load and makes adjustments in the working depth of a mounted or semi-mounted implement to maintain a substantially constant preselected draft load. Most draft control systems in commercial use today utilize mechanical draft sensing due to the ruggedness and durability of such devices. However, with the mechanical draft sensing devices previously known to applicant, all had the disadvantage of inaccuracy caused by hysteresis or load loss because of relative movement of the mechanical components.

SUMMARY OF THE INVENTION

The primary object of the present invention is to provide a draft sensing device which is simpler in construction and more accurate than mechanical draft sensing devices previously known.

It is a further object of the present invention to provide a draft sensing system which incorporates a draft sensing device which is simpler and more accurate than previously known draft sensing devices.

Another object of the present invention is to provide a responsive draft sensing device which does not have any movable parts.

Yet another object of the present invention is to provide a draft sensing device which utilizes a load pin in torsional stress to measure draft load.

These and additional objects and advantages of the present invention will become apparent to those skilled in the art from a reading of the following detailed description when taken in conjunction with the accompanying drawings.

DESCRIPTION OF THE PREFERRED EMBODIMENT

Figure 3:
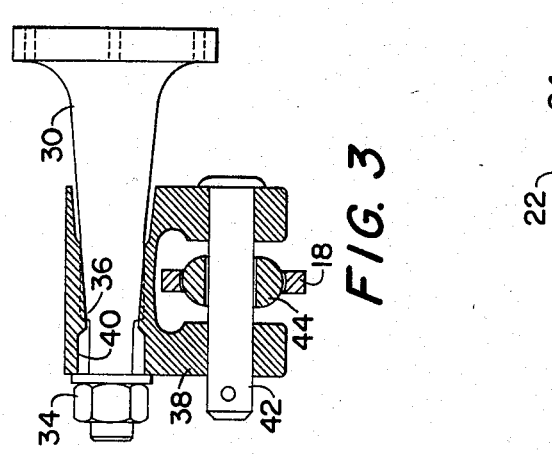
FIG. 3 is a sectional view of the draft sensing device according to the present invention.
Figure 2:
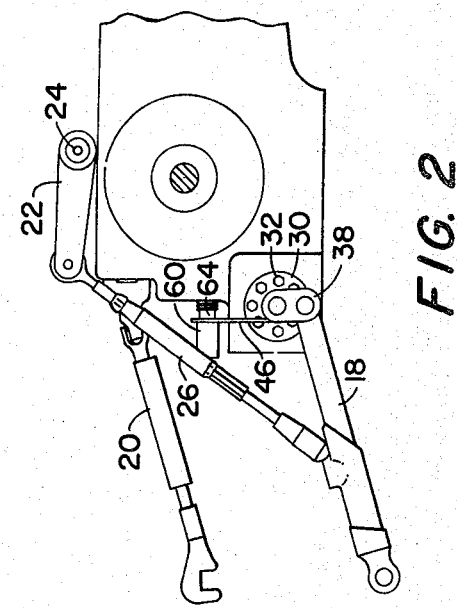
FIG. 2 is a view taken along line 2—2 of FIG. 1.

Referring now to the drawings, a tractor on which the draft sensing device in combination with a draft control system can be incorporated is indicated by the numeral 10 and includes a body 12 supported on wheels 14. An operator's station 16 is supported on the body 12. A three-point hitch is connected to the body 12 and includes a pair of pivotally mounted trailing draft links 18, a center link 20, a pair of crank arms 22 mounted on opposite ends of a rockshaft 24 and a pair of lift links 26 interconnecting the crank arms and draft links for vertically raising and lowering the draft links as the rockshaft is rotated. The rockshaft 24 is under the control of a hydraulic cylinder 28 (see FIG. 4). The tractor and three-point hitch is of conventional structure and is for illustration purposes only. The invention to be described can be used with other types of three-point hitches, such as those where the draft links are under the control of a pair of hydraulic cylinders connected directly between the tractor body and draft links.

Figure 1:
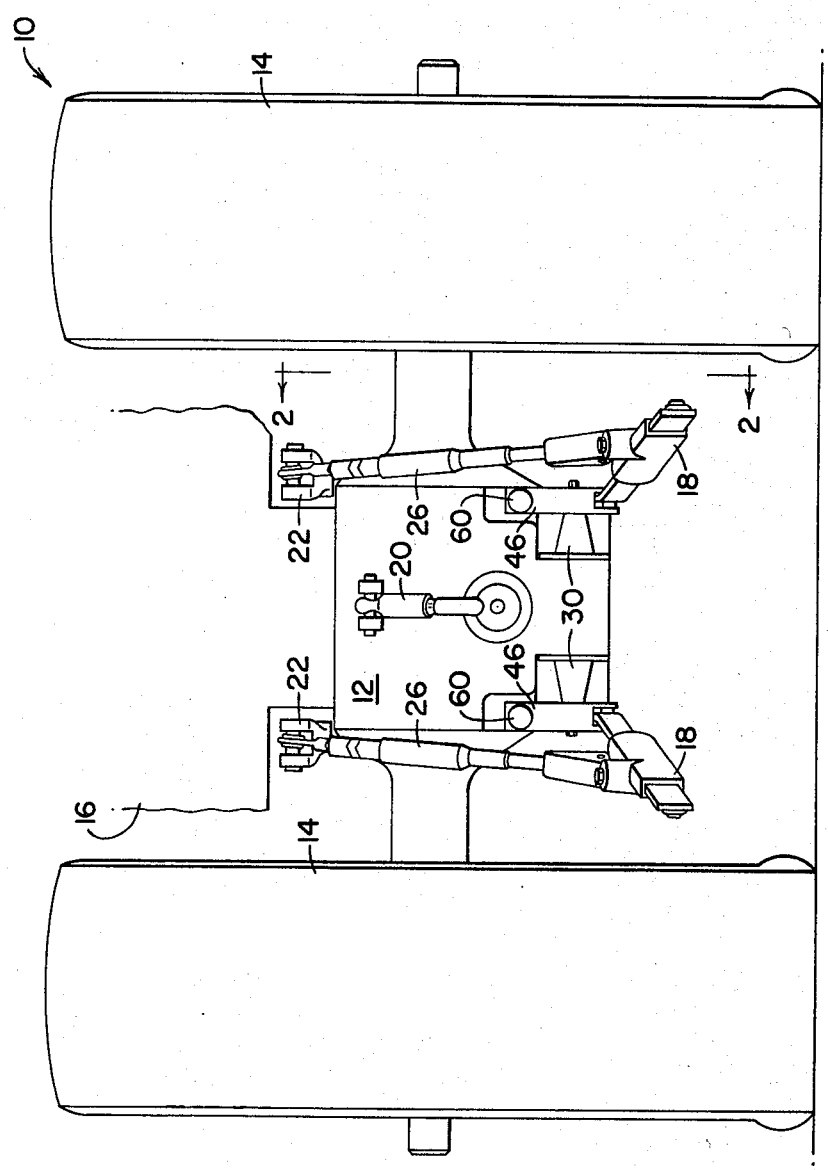
FIG. 1 is a rear elevational view of a tractor incorporating the draft sensing device of the present invention.

The draft sensing device according to the present invention includes a tapered load pin 30, there being one load pin at each side of the tractor. Each load pin is provided with an apertured flange at its large end and is rigidly secured to the tractor body 12 by bolts 32 which extend through the aperture flange. Each load pin extends outwardly from the large flanged end to a free small end. As can be seen from FIGS. 1 and 3, each load pin 30 is supported at one end only with respect to the body 12, this one supported end being the large end which is fastened to the tractor body 12 via bolts 32. The extreme outer portion of the free end of load pin 30 is threaded to receive a nut 34. Approximate its free end, the load pin 30 is provided with splines 36.

A load arm 38 is mounted on the free end of each load pin. The load arm, as viewed from the rear in FIG. 3, is generally of inverted U shape and is provided with a splined transverse opening 40 through its bight portion. Each load arm 38 is positioned on its respective load pin 30 so that the splines of the opening 40 mate with splines 36 and the load arm is wedged and held securely on its load pin by the nut 34. The legs of each generally inverted U-shaped load arm 38 are apertured to receive a pin 42 which serves to pivotally mount the forward end of a respective draft link 18 through a ball 44 which provides a universal mounting.

A bracket 46 is secured to each load arm and extends upwardly to a free end position adjacent the tractor body 12. A linear potentiometer 48 is secured to the upper end of each bracket 46 by bolts 52 and has the stem 50 of its movable member projecting into engagement with the tractor body 12. The linear potentiometer 48 is protected on the bracket 46 by a cap 60 secured to the bracket 46 by bolts 62, and the movable stem 50 is protected by a flexible cover 64 which has one end clamped between the base of potentiometer 48 and the bracket 46 and its other end clamped to the tractor body 12 by bolts 66 and ring member 68.

Figure 4:
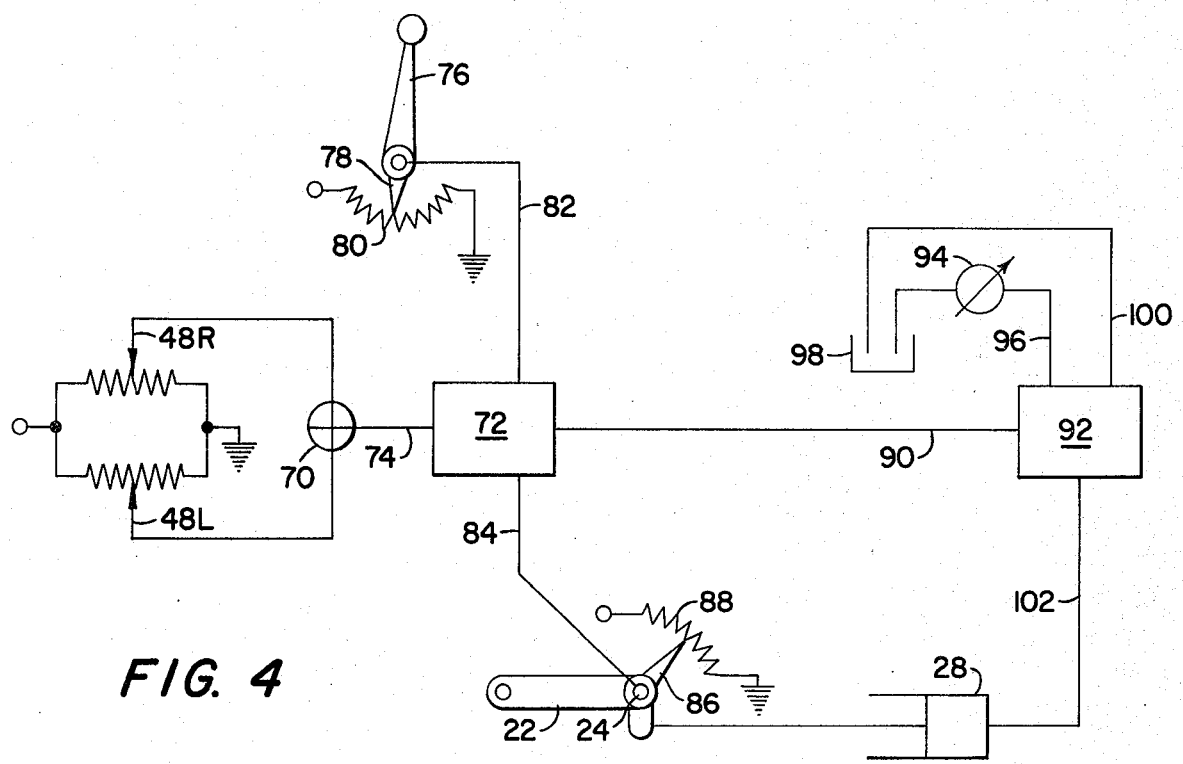
FIG. 4 is a schematic diagram of a draft control system in which the draft sensing device of the present invention can be used.
Figure 5:
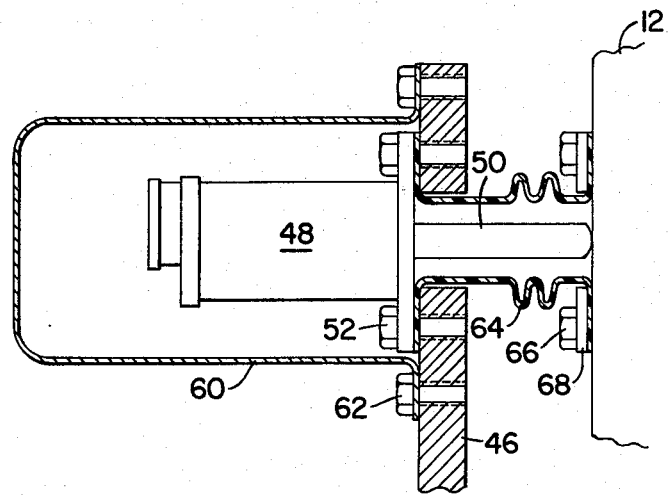
FIG. 5 is an enlarged view of a signal generating device usable with the present invention.

A draft control system, with which the sensing device according to the present invention may be utilized, is illustrated in FIG. 4 wherein the two linear potentiometers 48 are indicated with the suffixes R and L to represent the potentiometers on the right and left-hand sides of the tractor. The outputs from the two potentiometers are combined in a summing device 70 which provides a single draft signal to a control circuit 72 through lead 74. An operator provides a signal of desired draft or working depth to the control circuit 72 through a manual control lever 76. The lever 76 carries a wiper 78 of a rheostat 80. The wiper 78 is connected to the control circuit 72 through lead 82 to provide the signal to the control circuit 72. The actual position of the draft links 18 or the working depth of an implement is signaled to the control circuit 72 through a lead 84 which is connected to a wiper 86 of a rheostat 88. The wiper 86 is connected to and moves with the rockshaft 24. The output from the control circuit 72 travels through lead 90 to an electro-hydraulic valve 92 which controls the flow of fluid to and from the hydraulic cylinder 28. The electro-hydraulic valve 92 is connected to a pump 94 through hydraulic line 96 and is connected to a reservoir 98 through hydraulic line 100. The valve 92 is also connected to the hydraulic cylinder 28 through hydraulic line 102.

The control circuit 72 and electro-hydraulic valve 92 form a control means for the hydraulic cylinder 28. The control circuit 72 can be adjusted so that the draft control system is responsive to either position or draft load or a combination of the two so that if either position or draft goes beyond a predetermined limit, the control means will actuate the hydraulic cylinder 28 to make an appropriate adjustment.

For the purpose of explaining the operation of the draft sensing device and draft control system, it will be assumed that a plow is connected to the links 18 and 20. The operator will provide a signal of the desired draft to the control circuit 72 through appropriate manipulation of the lever 76. The control circuit 72 basically makes a comparison of this signal with the draft signal it receives through the lead 74 and provides an error signal to the valve 92 through the lead 90. Assuming that the manipulation of the lever 76 occurred when the plow was in a raised position, the draft signal would be low so the signal provided through the lead 90 to the valve 92 would move the valve to a position in which it connects the fluid line 100 with the line 102 so that the weight of the implement will cause the hydraulic cylinder to retract forcing fluid into the reservoir 98.

As the plow engages and enters the ground, it provides a rearwardly directed force on the draft links 18 and this force, acting through the load arms 38 will cause some rearward bending and torsional distortion of the load pins 30. The bending and torsional distortion of the load pins 30 causes movement of the load arms 38 and the brackets 46, this movement being proportional to the draft load. The torsional distortion of the load pins 30 is amplified and measured by movement of the brackets 46 toward the tractor body 12. As the upper end of the brackets 46 moves toward the tractor body 12, the stems 50 of the potentiometers 48 will be forced inwardly changing the output from the potentiometers 48. The output signals from the potentiometers 48 are summed at summing device 70 and a single signal of draft load is transmitted to the control circuit 72 through the lead 74. As the signal through the lead 74 approaches that of the lead 82 so that there is no error between the two, the control circuit 72 provides a signal through the line 90 to the valve 92 to return the valve 92 to a closed position. As draft forces vary, the signal through lead 74 will vary and the control circuit 72 will provide an error signal through lead 90 to valve 92 to make an appropriate adjustment of the implement through actuation of the hydraulic cylinder 28. For example, if a draft load increases beyond that selected by the operator, the control circuit 72 will provide an error signal to the valve 92 to connect the pump 94 to the hydraulic cylinder 28 through hydraulic lines 96 and 102 to raise the implement until the two input signals to the control 72 through the leads 74 and 82 are equal.

By making an appropriate adjustment to the control circuit 72, the signals through the leads 82 and 84 will be compared so that the draft links and hence the implement connected thereto will be strictly position responsive.

The advantage of the invention is that the draft sensing device which consists of the load pins 30, load arms 38 and brackets 46 is extremely simple as compared to prior art load sensing devices and has no relatively movable parts which will cause hysteresis or load loss.

While the embodiment of the invention disclosed in the drawings includes a draft sensing device for each of the lower links 18, it will be understood by those skilled in the art that a single draft sensing device could be utilized with the upper link 20, but in such a case it would not be possible to have draft control of a semi-mounted implement which is connected only to the links 18.

It should also be understood that the potentiometers 48 and the draft control system schematically illustrated in FIG. 4 are merely representative of the many ways in which the signal provided by the draft sensing device can be utilized. For example, it is within the scope of the invention to use the draft sensing device in combination with variable transformers or variable inductance coils, such as shown in U.S. Pat. Nos. 3,516,498 to Schowalter and 3,994,348 to Schowalter. It is also within the scope of the invention to utilize the draft sensing device in a completely mechanical system in which the upper ends of the brackets 46 are connected with a load equalizing means such as described in U.S. Pat. No. 3,520,369 to Nicholson.

Having described a specific embodiment of the draft sensing device of the present invention, disclosed one draft control system with which the draft sensing could be utilized and made reference to other draft control systems with which the draft sensing can be utilized, various modifications within the spirit and scope of the invention will become apparent to those skilled in the art and can be made without departing from the underlying principles of the invention. Therefore, the invention should not be limited to the specific embodiment described and illustrated, but should be limited only by the following claims.

I claim:

1. Draft load sensing means for use on a tractor with a tractor body, the sensing means comprising:
    a load pin having a free end and an end having means for rigidly securing the load pin to the tractor body;
    a generally U-shaped load arm rigidly secured to the free end of the load pin, the U-shaped load arm comprising a bight portion and legs extending therefrom, the bight portion including a transverse opening extending therethrough for receiving the load pin, the legs including apertures therein;
    a pivot pin received by the apertures in the legs and extending therebetween;
    a draft link with an aperture therein for pivotally receiving the pivot pin; and
    means on the load arm movable in response to torsional distortion of the load pin caused by loads on the draft link, such movement being proportional to the draft load.

2. Draft load sensing means as set forth in claim 1 wherein the free end of the load pin and the transverse opening in the bight of the load arm are provided with mating splines to non-rotatably connect the load arm to the free end of the load pin.

3. Draft load sensing means as set forth in claim 1 wherein the load pin is tapered, the larger end is connected to the tractor body and the smaller end is the free end.

4. Draft load sensing means as set forth in claim 3, wherein the means responsive includes a bracket secured to the load arm for movement in response to distortion of the load pin and extending to a free end of the bracket adjacent the tractor body, and signal generating means mounted on the free end of the bracket and having a movable member engaging the tractor body.

5. Draft load sensing means for use on a tractor having a tractor body, the sensing means comprising:
- a draft link with an aperture therein;
- a load pin having a free end and an end having means for rigidly securing the load pin to the tractor body;
- a generally U-shaped load arm non-rotatably secured to the free end of the load pin, the load arm comprising a bight portion and legs extending therefrom, the bight portion including a transverse opening extending therethrough for receiving the load pin, the legs including apertures therein;
- a pivot pin received by the apertures in the legs and extending therebetween, the pivot pin being received by the aperture in the draft link; and
- means on the load arm responsive to torsional distortion of the load pin caused by loads on the draft link to provide a signal indicative of the load.

6. In a tractor having vertically movable hitch means with a draft link having an aperture therein, power means for raising and lowering the hitch means, control means for operating the power means and sensing means responding the changes in draft loads on the hitch means to cause actuation of the control means, the sensing means comprising:
- a load pin having one end rigidly secured to the tractor and projecting outwardly therefrom to a free end;
- a generally U-shaped load arm non-rotatably secured to the free end of the load pin, the load arm comprising a bight portion and legs extending therefrom, the bight portion including a transverse opening extending therethrough for receiving the load pin, the legs including apertures therein offset from the axis of the load pin whereby varying draft loads on the hitch means cause varying movement of the load arm relative to the tractor due to distortion of the load pin;
- a pivot pin received by the apertures in the legs and extending therebetween, the pivot pin being received by the aperture in the draft link, the draft link being positioned between the legs; and
- means interconnecting the load arm and the control means to provide signals to the control means indicative of the draft load.

7. The combination set forth in claim 6 wherein the load pin is tapered, the larger end is connected to the tractor body and the smaller end is the free end.

8. The combination set forth in claim 7, wherein:
the hitch means includes a further draft link, and
the sensing means including a further load pin, the tractor having one of the load pins located at each side thereof, the sensing means also including a further load arm, each load arm connecting one of the draft links to a respective one of the load pins.

9. The combination set forth in claim 7 wherein the means interconnecting the load arm and the control means includes signal generating means carried by the load arm and signal transfer means connected between the generating means and the control means.

10. The combination set forth in claim 6 wherein the free end of the load pin and the transverse opening in the bight portion of the load arm are provided with mating splines to non-rotatably connect the load arm to the free end of the load pin.

11. The combination set forth in claim 6 wherein the means interconnecting the load arm and the control means includes signal generating means carried by each load arm, means for summing the signals from the signal generating means, the signal transfer means connected between the summing means and the control means.

12. Draft load sensing means for sensing loads in a draft link on a tractor having a tractor body, the sensing means comprising:
- a tapered load pin having a smaller free end and a larger end having means for rigidly securing the load pin to the tractor body;
- a generally U-shaped load arm non-rotatably secured to the free end of the load pin, the load arm including a bight portion and a plurality of legs extending therefrom, the bight portion including a transverse opening extending therethrough for receiving the load pin, the legs including transverse bores extending therethrough;
- a pivot pin with a portion thereof received by the bores in the legs;
- means for pivotally coupling the draft link to the pivot pin; and
- means on the load arm movable in response to torsional distortion of the load pin caused by loads on the draft link, such movement being indicative of the draft load.

13. A draft load sensor for sensing draft loads in a draft link on a tractor having a tractor body, the sensor comprising:
- a load pin having a free end and a fixable end spaced transversely from the free end, the fixable end having securing means for rigidly securing the load pin to the tractor body, the securing means for securing the load pin to the tractor body only at its fixable end;
- a load arm rigidly secured to the free end of the load pin;
- a draft link pivotally connected to the load arm and extending rearwardly therefrom; and
- means coupled to the load arm movable in response to rearward bending and torsional distortion of the load pin caused by draft loads on the draft link, such movement being representative of the draft loads.

14. A draft load sensor for sensing draft loads in a draft link on a tractor having a tractor body, the sensor comprising:
- a tapered load pin having a smaller free end and a larger fixable end spaced transversely from the free end, the fixable end having securing means for rigidly securing the load pin to the tractor body, the securing means for securing the load pin to the tractor body only at its fixable end;
- a load arm rigidly secured to the free end of the load pin;
- a draft link pivotally connected to the load arm and extending rearwardly therefrom; and
- means coupled to the load arm movable in response to rearward bending and torsional distortion of the load pin caused by draft loads on the draft link, such movement being representative of the draft loads.

* * * * *